(12) United States Patent
Ames

(10) Patent No.: US 6,563,969 B2
(45) Date of Patent: May 13, 2003

(54) MULTIPLEXED FIBER LASER SENSOR SYSTEM

(75) Inventor: Gregory H. Ames, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 30 days.

(21) Appl. No.: 09/983,046

(22) Filed: Oct. 15, 2001

(65) Prior Publication Data

US 2003/0072514 A1 Apr. 17, 2003

(51) Int. Cl.⁷ .................................................. G02B 6/00
(52) U.S. Cl. ............................ 385/12; 385/24; 356/477
(58) Field of Search ............................... 356/477, 478, 356/479; 385/12, 24

(56) References Cited

U.S. PATENT DOCUMENTS 5,771,250 A * 6/1998 Shigehara et al. ............. 372/6
5,848,204 A * 12/1998 Wanser ........................ 385/12
6,212,306 B1 * 4/2001 Cooper et al. ................ 385/12
6,449,047 B1 * 9/2002 Bao et al. .................... 356/478

* cited by examiner

Primary Examiner—Hung N. Ngo
(74) Attorney, Agent, or Firm—James M. Kasischke; Michael J. McGowan; Michael F. Oglo

(57) ABSTRACT

The present invention relates to a sensor interrogation system which comprises an optical fiber, at least one sensor containing first and second fiber lasers attached to the optical fiber with the first fiber laser being located spectrally at a first wavelength and the second fiber laser being located spectrally at a second wavelength different from the first wavelength, a pump laser for causing light to travel down the optical fiber so as to cause each of the fiber lasers to lase at its distinct wavelength and generate a distinct laser signal representative of the distinct wavelength, at least one filter for receiving the laser signals generated by the first and second lasers and for transmitting the laser signals from the first and second lasers within a wavelength band, and first and second scanning Fabry-Perot spectrum analyzers for receiving the laser signals for determining the wavelength difference between said fiber lasers.

28 Claims, 2 Drawing Sheets

MULTIPLEXED FIBER LASER SENSOR SYSTEM

CROSS REFERENCE TO OTHER PATENT APPLICATIONS

This patent application is co-pending with two related patent applications entitled FIBER OPTIC PITCH OR ROLL SENSOR Ser. No. 09/983,047 and FIBER OPTIC CURVATURE SENSOR FOR TOWED HYDROPHONE ARRAYS Ser. No. 09/983,048, by the same inventors as this application.

STATEMENT OF GOVERNMENT INTEREST

The invention described herein may be manufactured and used by or for the Government of the United States of America for governmental purposes without the payment of royalties thereon or therefore.

BACKGROUND OF THE INVENTION (1). Field of the Invention

This invention relates to a system for the multiplexing and interrogation of fiber optic Bragg grating based sensors.

(2). Description of the Prior Art

Fiber optic Bragg gratings are periodic refractive index differences written into the core of an optical fiber. They act as reflectors with a very narrow reflected wavelength band, while passing all other wavelengths with little loss. Temperature or strain changes the wavelength at which they reflect. They can be made into sensors for any one of a number of measurands by designing a package that strains the grating in response to changes in the measurand.

U.S. Pat. Nos. 5,633,748 to Perez et al.; 4,996,419 to Morey; 5,627,927 to Udd; 5,493,390 to Varasi et al.; and 5,488,475 to Friebele et al. illustrate the use of Bragg gratings as a sensor. All of the sensors in these patents function by using the shift of the Bragg grating reflection wavelength.

U.S. Pat. No. 5,564,832 to Ball et al. relates to a birefringent active fiber laser sensor. While Ball et al. use more than one Bragg grating laser in his sensor, they use each laser singly rather than in a pair. Moreover, each laser is birefringent such that it lases in two separate polarization modes at different frequencies. Ball et al. detect the wavelength difference between these two modes. The use of birefringent sensors means that Ball et al. must arrange the measurand to affect the birefringence. Ball et al. determine the frequency difference between the two birefringent modes by electronically measuring the beat or difference frequency. The present invention does not use lasers which are birefringent nor rely on changes in birefringence.

An alternative sensor is the fiber optic Bragg grating laser. Two gratings at matched wavelengths are written into a length of optical fiber which is doped to be an active medium. The most common is an Erbium doped silica glass fiber. When power from a pump laser is injected into the cavity, the structure emits output laser light. If the cavity is short enough, the emission is in a single longitudinal mode. Any measurand which strains the cavity causes the laser emission to shift in wavelength.

The difficulty to date has been in developing systems which can both read the wavelength shift, and hence the strain, with great sensitivity, and do so efficiently for multiple sensors. The most sensitive techniques developed have used interferometric means to measure the shift in wavelength. However, these techniques measure only dynamic changes and are incapable of reading absolute values. A device such as the Wavemeter sold by Burleigh Instruments uses an interferometric technique to give both high sensitivity and absolute measurements. However, it does so by changing the path delay in the interferometer, resulting in a slow measurement. Diffraction based spectrum analyzers have limited resolution, 0.1 nm corresponding to 60 microstrains. Fabry-Perot etalon spectrum analyzers have high resolution but read relative wavelength.

SUMMARY OF THE INVENTION

Accordingly, it is an object to provide an improved system for interrogating a plurality of fiber optic Bragg grating based sensors.

It is a further object of the present invention to provide a system as above which provides efficient measurement of many sensors with absolute measurements, high strain sensitivity, high dynamic range, and fast measurements.

The foregoing objects are achieved by the sensor interrogation system of the present invention.

In accordance with the present invention, a sensor interrogation system broadly comprises an optical fiber, at least one sensor containing first and second fiber lasers attached to the optical fiber with the first fiber laser being located spectrally at a first wavelength and the second fiber laser being located spectrally at a second wavelength different from the first wavelength, means for causing light to travel down the optical fiber so as to cause each of the fiber lasers to lase at its distinct wavelength and generate a distinct laser signal representative of the distinct wavelength; filter means for receiving the laser signals generated by the first and second lasers and for transmitting the laser signals from the first and second lasers within a wavelength band, and means for receiving the laser signals and for determining the wavelength difference between the fiber lasers.

A method for interrogating a sensor system having an optical fiber, at least one sensor containing first and second fiber lasers attached to the optical fiber with the first fiber laser being located spectrally at a first wavelength and the second fiber being located spectrally at a second wavelength broadly comprises the steps of causing light to travel down the optical fiber so as to cause each of the fiber lasers to lase at its distinct wavelength and generate a distinct laser signal representative of the distinct wavelength. transmitting the laser signals generated by the first and second fiber lasers to a filter means, allowing laser signals within a wavelength band to pass through said filter means, providing analyzer means to receive the laser signals passed through the filter means, and determining the wavelength difference between the first and second fiber lasers from the received laser signals.

Other details of the sensor interrogation system of the present invention, as well as other objects and advantages attendant thereto, are set forth in the following detailed description and the accompanying drawings, wherein like reference numerals depict like elements.

DESCRIPTION OF THE PREFERRED EMBODIMENTS

Figure 1:
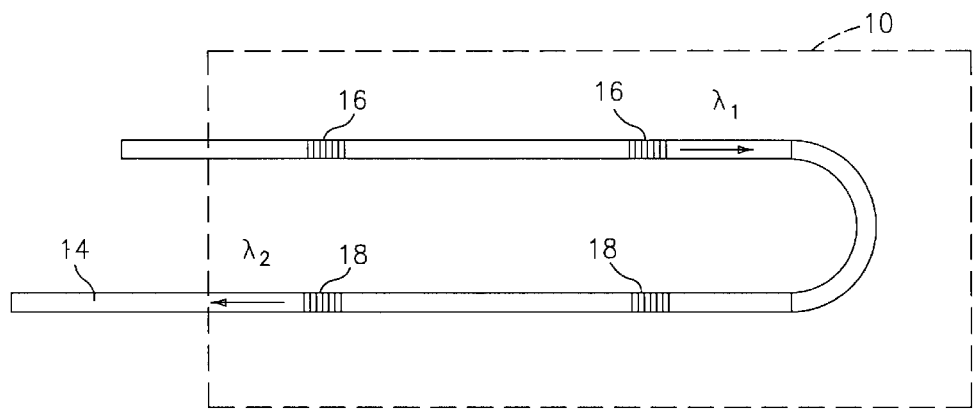
FIG. 1 illustrates a sensor used in the system of the present invention.

Referring now to the drawings, FIG. 1 illustrates a sensor to be used in the system 12 of the present invention. The sensor 10 has an optical fiber 14 containing a first optical fiber Bragg grating laser 16 and a second optical fiber Bragg grating laser 18. The Bragg gratings of each of the lasers 16 and 18 reflects at a different wavelength so that the lasers 16 and 18 emit at different wavelengths. The sensor 10 is designed so that the measurand has a different effect on the two lasers 16 and 18. In one embodiment of the sensor 10, one of the lasers 16 and 18 may be sensitive to the measurand while the other of the lasers is insensitive. In a second embodiment of the sensor 10, each of the lasers 16 and 18 may be sensitive to the measurand but in the opposite direction. The sensor 10 may be used to measure any measurand provided that the sensor structure can be designed which strains the fiber lasers 16 and 18 in the manner just described.

As the measurand shifts, the difference in wavelength between the two lasers 16 and 18 changes and the difference can be calibrated to the value of the measurand to provide an absolute measurement.

Figure 2:
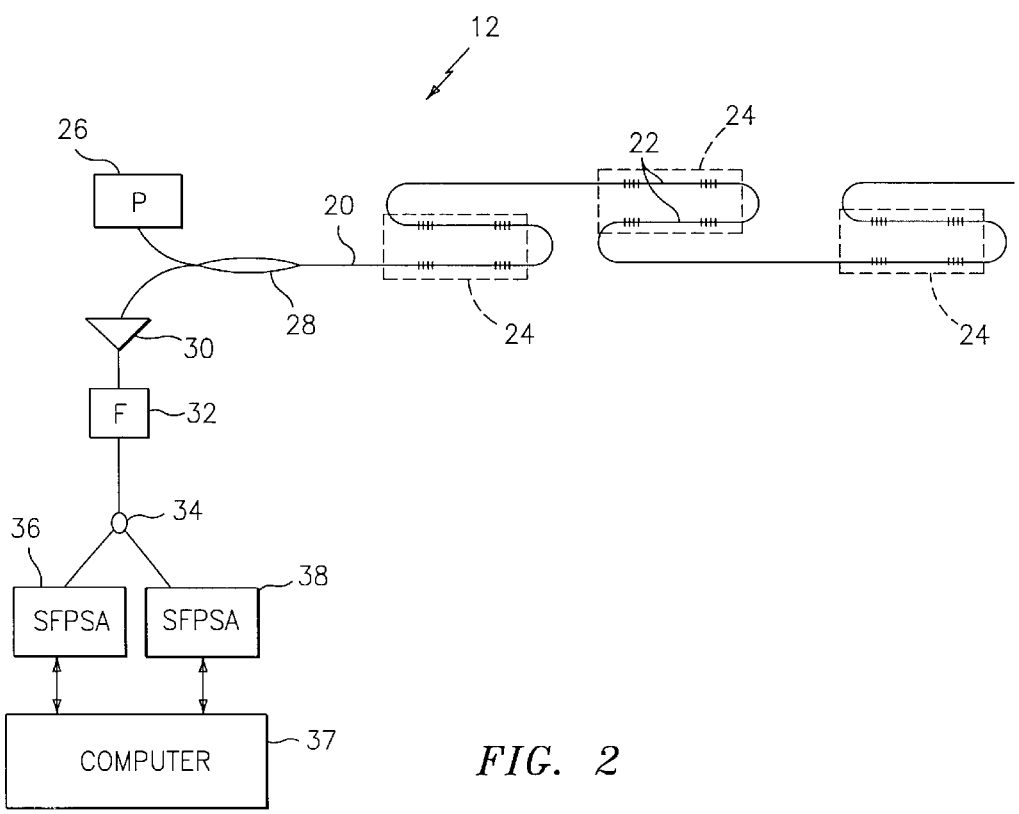
FIG. 2 is a schematic representation of a multiplexed fiber laser sensor system.

Referring now to FIG. 2, a multiplexed fiber laser sensor system 12 is illustrated. In this system, a single optical fiber 20 contains numerous fiber lasers 22, two of which form each sensor 24. Each laser 22 is located spectrally at a different wavelength.

The system includes a pump laser 26 which provides pump light at the distinct pump wavelength through a wavelength demultiplexer 28. The pump light travels down the optical fiber 20 and is absorbed within each fiber laser cavity, causing each laser 22 to lase at its distinct wavelength in a continuous manner. The light from each laser 22 returns down the optical fiber 20, through the wavelength demultiplexer 28, through an optional fiber amplifier 30, to a filter 32. The filter 32 passes a narrow wavelength band and is tunable to change the band selected. The band is wide enough to pass the laser signals from both lasers 22 comprising a single one of the sensors 24. All other lasers 22 are blocked or severely attenuated. The signals then pass to a junction 34 where the light is split to two scanning Fabry-Perot spectrum analyzers 36 and 38. One such device which may be used for each of the analyzers 36 and 38 is the Supercavity device from Newport Corporation of Irvine, Calif. Such devices provide high finesse, thus giving a high ratio of dynamic range to accuracy.

A scanning Fabry-Perot spectrum analyzer is characterized by a free spectral range which is the spectral dynamic range over which spectral features can be unambiguously identified. Two laser sensors must emit at wavelengths within one free spectral range of each other if the scanning Fabry-Perot spectrum analyzer is to read the spectral difference accurately. In a typical sensor system, the laser sensors should be separated by a particular spectral distance. This would normally set the requirement for a scanning Fabry-Perot spectrum analyzer with a greater free spectral range. Since the resolution is directly related to the free spectral range, this yields a limitation on the resolution that may be achieved. The present invention however includes a means to measure spectral features which are separated by more than one free spectral range without ambiguity. This effectively extends the dynamic range of the device without sacrificing its resolution. This in turn allows greater resolution in the readout of the sensor.

Figure 3:
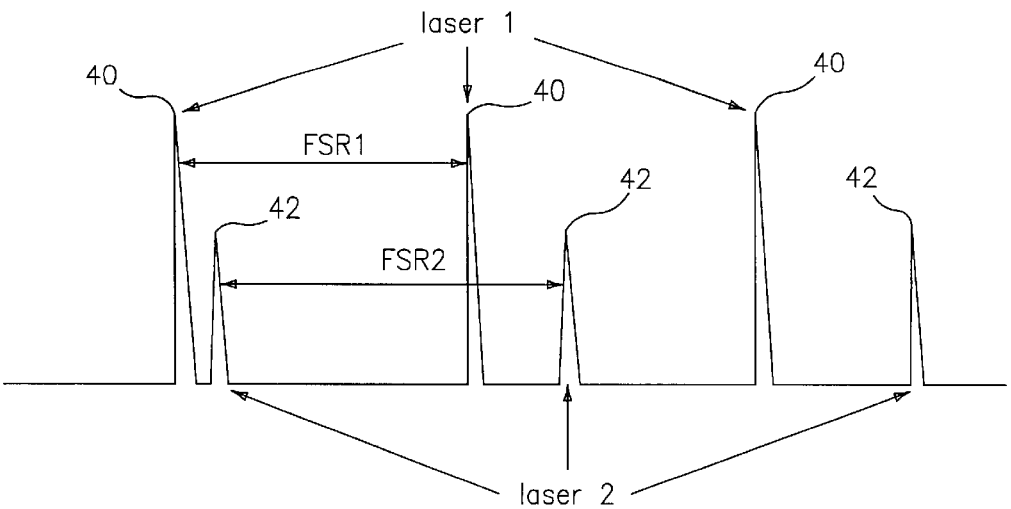
FIG. 3 is an output trace from a scanning Fabry-Perot spectrum analyzer.

The two scanning Fabry-Perot spectrum analyzers 36 and 38 differ in construction by the gap of the etalon and hence the free spectral range. The first analyzer 36 has a small gap, $L_1$, on the order of about 20 microns. Such a device with a finesse of 5000 will have a free spectral range of 60 nanometers. The free spectral range is the spectral range between orders of the interferometer. When two lasers at different wavelengths are injected into the analyzer 36, an output trace such as that shown in FIG. 3 is provided. One laser 22 in the sensor 24 produces several narrow peaks 40 separated by the free spectral range of the Fabry-Perot for that wavelength. The second laser 22 in the sensor 24 produces another set of peaks 42 with a slightly different spacing. The order number for each peak is given by the equation:

$$n = L_1/\lambda.$$

where n is the order number, $L_1$ is the gap of the first analyzer 36, and $\lambda$ is the emission wavelength of the laser whose peak is being considered.

The free spectral range (FSR) is much greater than the difference in emission wavelength of the two fiber lasers in the sensor 24. As a result, their peaks appear close together and the peaks share the same order. To perform a measurement, the trace generated by the scanning Fabry-Perot spectrum analyzer 36 is transmitted to a computer 37 where it is digitized and where a computer program analyzes the trace of FIG. 3. The computer 37 may comprise any suitable computer known in the art. The computer program may be any suitable program for identifying the two peaks 40 and 42 and for determining the spectral spacing of the peaks, $\Delta\lambda_1$. The computer program can be in any conventional computer language known in the art.

Another portion of the light enters the second analyzer 38. This device has a smaller gap, $L_2$, on the order of about 25 mm. As a result, the analyzer 38 has very high resolution but a small free spectral range. The difference in laser emission wavelength of the two lasers 22 in the sensor 24 is so large in contrast to the free spectral range of the analyzer 38, that adjacent peaks of the two lasers do not have the same order number. The order number of a laser line in this analyzer is given by the equation:

$$n = L_2/\lambda.$$

where n is the order number, $L_2$ is the gap of the analyzer 38, and $\lambda$ is the emission wavelength of the laser whose peak is being considered.

To obtain the spectral difference between the two lasers 22 in a sensor 24 with the resolution of the analyzer 38, it is necessary to measure the difference between the peaks of the same order. In a typical scanning Fabry-Perot spectrum analyzer, this is not possible because the scan range may not be sufficient that the same order is even displayed for each laser. Furthermore, it is not possible to tell the order number of each line. This invention uses the $\Delta\lambda_1$ information from the analyzer 36 to calculate the order number difference between two selected peaks on the second analyzer 38. The measured spectral difference between these two peaks can then be corrected for the order number difference to give the true spectral difference between the outputs of the lasers 22 in the sensor 24.

The trace from the analyzer 38 is also transmitted to computer 37 where it is digitized and the aforementioned computer program is used to analyze the trace. The computer program in the computer 37 identifies two adjacent peaks, one corresponding to each of the lasers 22. The scanning Fabry-Perot spectrum analyzer scan distance corresponding to the first laser is $d_1$, while the distance corresponding to the second laser is $d_2$. The computer program also identifies the peaks corresponding to the same laser by looking for uniform spectral differences. The scan difference between two adjacent peaks of the same laser is calculated and gives the laser wavelength. This gives the emission wavelength of the first laser $\lambda_1$, and that of the second laser, $\lambda_2$.

The emission wavelength of the second laser 22 may also be computed as:

$$\lambda_2' = \lambda_1 + \Delta\lambda_1.$$

The order difference between the two peaks is given by:

$$\Delta n = (d_1/\lambda_1) - (d_2/\lambda_2').$$

It should be noted that $\lambda'$ rather than $\lambda_2$ has been used in this calculation. The accuracy of $\Delta n$ depends on the accuracy of the difference between the two wavelengths and using $\lambda_2'$ is more accurate.

The scan distance difference between the two adjacent peaks of the two different lasers is:

$$\Delta d = d_2 - d_1.$$

This is now corrected by the order number difference so that the scan distance of two same order peaks are compared:

$$\Delta d' = \Delta d + \Delta n \lambda_2.$$

The sensor measurand is proportional to this corrected scan distance difference. Calibration of the sensor will yield the calibration factor.

It is noted that the use of the order number correction has allowed the system to compare features in the second analyzer 38 that do not have the same order number. It has thus greatly expanded the dynamic range of the analyzer 38 and allowed it to be configured for finer resolution.

An option is to do the entire order number correction using a single scanning Fabry-Perot spectrum analyzer. In the above illustration, $\lambda_2$ could have been used instead of $\lambda_2'$ in the equation for $\Delta n$. Since it is available directly from the trace of the second analyzer 38, the first analyzer 36 is not required. However, to ensure that the order number difference $\Delta n$ is calculated without error, the scanning Fabry-Perot spectrum analyzer's cavity must be shortened, limiting its resolution. This option is useful when less resolution is required by the application. It reduces the system components and the cost.

Figure 4:
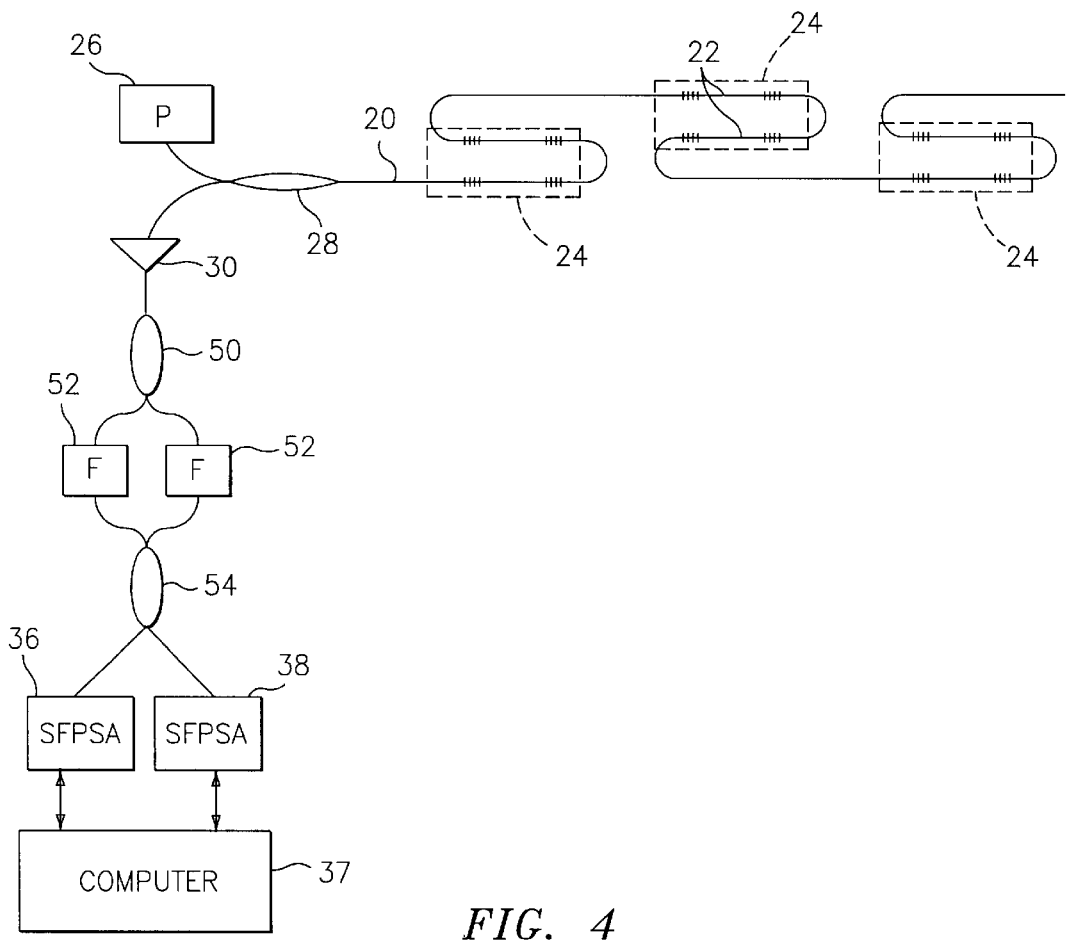
FIG. 4 illustrates an alternative embodiment of a multiplexed fiber laser sensor system.

An alternative configuration for the system 12 is shown in FIG. 4. In this system 12, the returning light is split by an optical coupler 50 into two paths. A tunable narrowband filter 52 is placed in either path. One filter 52 selects the wavelengths of the first laser sensor 22 of the sensor 24 to be selected. The other filter 52 selects the wavelength of the second laser sensor 22 of the sensor 24 to be selected. These are then combined by another coupler 54 and then split to the two analyzers 36 and 38. This alternative configuration allows a narrower filter because each filter 52 passes one instead of two lasers. This in turn allows the lasers 22 to be placed closer in wavelength and more lasers to be placed on each optical fiber 20.

As can be seen from the foregoing discussion, the system of the present invention achieves very fine strain sensitivity, yet does so with absolute measurements. This level of absolute strain sensitivity exceeds that achieved by other techniques.

Many sensors are multiplexed on a single fiber. By achieving high sensitivity, large dynamic range is achieved without requiring the laser sensors to vary too far in wavelength. This allows more sensors to be placed per fiber.

The measurement provided by the system of the present invention is fast as compared to alternative absolute measurement techniques. This results because the requirement to scan an optical component by several centimeters is eliminated. The rapid, short distance scanning of the piezo transducers in the scanning Fabry-Perot spectrum analyzer is sufficient. The measurement technique employed herein provides high dynamic range.

It should also be noted that common mode effects affecting both lasers of a sensor are eliminated. As an example, temperature may cause a fiber laser sensor to shift. This shift can cause a signal erroneously interpreted as a shift in the measurand. Because both lasers are co-located, they both shift in the same manner with temperature and their difference is approximately temperature insensitive.

If desired, the two lasers 22 comprising one of the sensors 24 may also be located on separate optical fibers. When such a configuration is used, after their filters, they would be combined by a single coupler.

It should be noted that any sensor configuration which results in the measurand producing a different effect on the two lasers may be used in the system of the present invention.

It is apparent that there has been provided in accordance with the present invention a multiplexed fiber laser sensor system which fully satisfies the objects, means, and advantages set forth hereinbefore. While the invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. A sensor interrogation system comprising:
   an optical fiber;
   at least one sensor containing first and second fiber lasers attached to said optical fiber;
   said first fiber laser being located spectrally at a first wavelength and said second fiber laser being located spectrally at a second wavelength different from said first wavelength;
   means for causing light to travel down said optical fiber so as to cause each of said fiber lasers to lase at its distinct wavelength and generate a distinct laser signal representative of said distinct wavelength;
   filter means for receiving said laser signals generated by said first and second lasers and for transmitting said laser signals from said first and second lasers within a wavelength band; and
   means for receiving said laser signals and for determining the wavelength difference between said fiber lasers.

2. A sensor interrogation system according to claim 1 wherein said means for receiving said laser signals comprises first means for generating a first trace containing a plurality of narrow peaks separated by a free spectral range produced by said laser signal from said first fiber laser and a plurality of peaks with a different spacing produced by said laser signal from said second fiber laser.

3. A sensor interrogation system according to claim 2 further comprising computer means for receiving said first trace, digitizing said first trace, and identifying two peaks and determining the spectral spacing of said peaks from said digitized first trace.

4. A sensor interrogation system according to claim 3 wherein said means for receiving said laser signals comprises a second means for generating a second trace containing a plurality of peaks produced by said laser signals from said first and second fiber lasers and wherein said computer means receives said second trace, digitizes said second trace, identifies two adjacent peaks with one peak corresponding to each of said fiber lasers, identifies the peaks corresponding to the same one of said first and second fiber lasers, determines the scan difference between two adjacent peaks of the same laser, and determining an emission wavelength for the first fiber laser and an emission wavelength for the second fiber laser.

5. A sensor interrogation system according to claim 4 wherein said first means comprises a first scanning Fabry-Perot spectrum analyzer having a first gap and said second means comprises a second scanning Fabry-Perot spectrum analyzer having a second gap smaller than said first gap.

6. A sensor interrogation system according to claim 1 wherein each said fiber laser comprises a fiber Bragg grating laser.

7. A sensor interrogation system according to claim 1 wherein a measurand has a first effect on said first fiber laser and a second effect on said second fiber laser.

8. A sensor interrogation system according to claim 1 wherein said first effect is in an opposite direction from said second effect.

9. A sensor interrogation system according to claim 1 wherein a measurand has a first effect on said first fiber laser and no effect on said second fiber laser.

10. A sensor interrogation system according to claim 1 wherein said light causing means comprises a pump laser for pumping light through said optical fiber and a demultiplexer.

11. A sensor interrogation system according to claim 1 wherein said filter means comprises a tunable filter.

12. A sensor interrogation system according to claim 1 further comprising an optical coupler for splitting said laser signals being returned by said first and second fiber lasers into first and second paths and wherein said filter means comprises a first tunable narrowband filter in said first path and a second tunable narrowband filter in said second path.

13. A sensor interrogation system according to claim 12 further comprising a second coupler for combining an output from said first filter and an output from said second filter.

14. A sensor interrogation system according to claim 1 further comprising a fiber amplifier to amplify the laser signals generated by said first and second lasers and for transmitting the amplified laser signals to said filter means.

15. A sensor interrogation system according to claim 1 further comprising a plurality of sensors attached to said optical fiber and each of said sensors having first and second fiber lasers operating at different wavelengths.

16. A sensor interrogation system according to claim 1 further comprising said filter means passing said laser signals from the fiber lasers of one of said sensors and blocking the passage of said laser signals from the fiber lasers of the remaining sensors.

17. A method for interrogating a sensor system having an optical fiber, at least one sensor containing first and second fiber lasers attached to the optical fiber with the first fiber laser being located spectrally at a first wavelength and the second fiber laser being located spectrally at a second wavelength different from the first wavelength, said method comprising the steps of:

causing light to travel down said optical fiber so as to cause each of said fiber lasers to lase at its distinct wavelength and generate a distinct laser signal representative of said distinct wavelength;

transmitting said lasers signals generated by said first and second fiber lasers to a filter means;

allowing laser signals within a wavelength band to pass through said filter means;

providing analyzer means to receive said laser signals passed through said filter means; and determining the wavelength difference between said fiber lasers from said received laser signals.

18. A method according to claim 17 wherein:

said analyzer means providing step comprises providing first and second scanning Fabry-Perot spectrum analyzers wherein said first scanning Fabry-Perot spectrum analyzer has a first gap and said second scanning Fabry-Perot spectrum analyzer has a second gap smaller than said first gap.

19. A method according to claim 18 wherein said wavelength determining step comprises:

supplying a first portion of said laser signals to said first scanning Fabry-Perot spectrum analyzer;

generating a first trace containing a plurality of narrow peaks separated by a free spectral range produced by the laser signal from the first fiber laser and a plurality of peaks with a different spacing produced by said laser signal from said second fiber laser with said first scanning Fabry-Perot spectrum analyzer;

transmitting said first trace to a computational device;

digitizing said first trace in said computational device; and identifying two peaks and determining the spectral spacing of said peaks from said digitized first trace.

20. A method according to claim 19 wherein said wavelength determining step comprises:

supplying a second portion of said first and second laser signals to said second scanning Fabry-Perot spectrum analyzer;

generating a second trace using said second scanning Fabry-Perot spectrum analyzer having a plurality of peaks generated by said first and second lasers; and using the spectral spacing of the peak information generated from said first trace to determine an order number difference between two selected peaks on said second trace.

21. A method according to claim 20 wherein said determining step further comprises:

measuring the spectral difference between said two selected peaks and correcting said measured spectral difference for order number difference to provide a true spectral difference between outputs from said first and second fiber lasers.

22. A method according to claim 21 wherein the determining step further comprises:

transmitting said second trace to said computational device;

digitizing said second trace;

identifying two adjacent peaks with one corresponding to each of said fiber lasers;

identifying the peaks corresponding to said first laser and the peaks corresponding to said second laser;

determining the scan difference between two adjacent peaks of the first laser and between two adjacent peaks of the second laser; and determining the emission wavelength of said first laser and the emission wavelength of said second laser from said scan differences.

23. A method according to claim 17 further comprising said transmitting step including amplifying said laser signals generated by said first and second fiber lasers before transmitting said laser signals to said filter means.

24. A method according to claim 17 wherein said transmitting step comprises splitting said laser signals into a first portion and a second portion and said allowing step comprises passing said first portion to a first tunable narrowband filter, passing said second portion to a second tunable narrowband filter, and combining an output of said first tunable narrowband filter with an output of said second tunable narrowband filter.

25. A method for interrogating a sensor system having an optical fiber, at least one sensor containing first and second fiber lasers attached to the optical fiber with the first fiber laser being located spectrally at a first wavelength and the second fiber laser being located spectrally at a second wavelength different from the first wavelength, said method comprising the steps of:

causing light to travel down said optical fiber so as to cause each of said fiber lasers to lase at its distinct wavelength and generate a distinct laser signal representative of said distinct wavelength;

providing first and second scanning Fabry-Perot spectrum analyzers wherein said first scanning Fabry-Perot spectrum analyzer has a first gap and said second scanning Fabry-Perot spectrum analyzer has a second gap smaller than said first gap;

transmitting said laser signals generated by said first and second fiber lasers to said first and second scanning Fabry-Perot spectrum analyzers;

transmitting an output from each of said spectrum analyzers to a processing unit;

determining a spectral spacing $\Delta\lambda_1$ of a first peak and a second peak from the output of said first spectrum analyzer using said processing unit; and determining an emission wavelength $\lambda_1$ of the first laser, an emission wavelength $\lambda_2$ of the second laser, a scan distance $d_1$ corresponding to the first laser, and a scan distance $d_2$ corresponding to the second laser from the output of said second spectrum analyzer using said processing unit.

26. A method according to claim 25 wherein the second determining step comprises determining the emission wavelength $\lambda_2'$ of the second laser using the equation:

$$\lambda_2' = \lambda_1 + \Delta\lambda_1.$$

27. A method according to claim 26, wherein the second determining step further comprises determining an order difference between two adjacent peaks on the output from the second laser using the equation:

$$\Delta n = (d_1/\lambda_1) - (d_2/\lambda_2').$$

28. A method according to claim 27 wherein the second determining step further comprises:

determining a scan distance difference $\lambda d$ between the two adjacent peaks of the first and second lasers using the equation:

$$\Delta d = d_2 - d_1; \text{ and}$$

correcting an order number difference $\Delta d'$ using the equation:

$$\Delta d' = \Delta d + \Delta n \cdot \lambda_2.$$

* * * * *